United States Patent
Pritchard et al.

(10) Patent No.: US 9,400,034 B1
(45) Date of Patent: Jul. 26, 2016

(54) ELECTRIC DRIVE SYSTEM

(71) Applicant: BorgWarner Inc., Auburn Hills, MI (US)

(72) Inventors: Larry A. Pritchard, Macomb, MI (US); Thaddeus Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/824,595

(22) Filed: Aug. 12, 2015

(51) Int. Cl.
- *B60K 17/348* (2006.01)
- *F16H 1/28* (2006.01)
- *B60K 1/00* (2006.01)
- *B60L 7/10* (2006.01)
- *B60K 17/16* (2006.01)

(52) U.S. Cl.
CPC .. *F16H 1/28* (2013.01); *B60K 1/00* (2013.01); *B60K 17/165* (2013.01); *B60L 7/10* (2013.01); *B60K 2001/001* (2013.01)

(58) Field of Classification Search
CPC .......................... B60K 2001/001; B60K 17/356
USPC ................................................ 180/65.6, 65.7
See application file for complete search history.

(56) References Cited

U.S. PATENT DOCUMENTS

| | | | | |
|---|---|---|---|---|
| 5,261,862 A * | 11/1993 | Pierce | ................... | B60K 17/08 475/200 |
| 5,419,406 A * | 5/1995 | Kawamoto | ............... | B60K 1/02 180/60 |
| 5,443,130 A * | 8/1995 | Tanaka | ................... | B60K 1/00 180/65.6 |
| 2002/0019284 A1 * | 2/2002 | Aikawa | ................... | B60K 1/00 475/150 |
| 2007/0123383 A1 * | 5/2007 | Yokoyama | ............. | B60K 6/365 475/5 |
| 2007/0249456 A1 * | 10/2007 | Meixner | ................ | B60K 17/16 475/150 |
| 2007/0251739 A1 * | 11/2007 | Marsh | ...................... | B60K 6/26 180/65.1 |
| 2007/0254765 A1 * | 11/2007 | Marsh | ...................... | B60K 6/26 475/220 |
| 2007/0259747 A1 * | 11/2007 | Thomas | ............... | B60K 17/356 475/5 |
| 2009/0111641 A1 * | 4/2009 | Kim | ......................... | B60K 6/36 477/5 |
| 2009/0197727 A1 * | 8/2009 | Janson | ................... | B60K 6/365 475/5 |
| 2009/0211824 A1 * | 8/2009 | Knoblauch | .............. | B60K 1/00 180/65.7 |
| 2009/0270217 A1 * | 10/2009 | Zohrer | ................... | B60K 23/04 475/225 |
| 2013/0053203 A1 * | 2/2013 | Smetana | ............... | F16H 57/082 475/159 |
| 2013/0130857 A1 * | 5/2013 | Gassmann | .............. | B60K 1/00 475/150 |
| 2013/0190124 A1 * | 7/2013 | Gassmann | .............. | B60K 1/00 475/150 |
| 2013/0203543 A1 * | 8/2013 | Sten | ....................... | F16H 48/36 475/150 |
| 2013/0281248 A1 * | 10/2013 | Cha | ......................... | B60K 17/04 475/150 |
| 2014/0135169 A1 * | 5/2014 | Rossey | .................... | B60K 1/00 477/9 |

(Continued)

OTHER PUBLICATIONS

U.S. Appl. No. 14/824,675, filed Aug. 12, 2015; Title: E-Assist With Torque Vectoring ; First named inventor: Larry A. Pritchard.

*Primary Examiner* — Jeffrey J Restifo

(74) *Attorney, Agent, or Firm* — BrooksGroup

(57) ABSTRACT

A product may include a differential unit that may be engaged with first and second axle shafts that may be driven from a common gear. An electrical machine may be positioned on a first side of the differential unit. A first shaft may extend from the electrical machine and into the differential unit. A power transfer unit may be positioned on a second side of the differential unit opposite the first side. A second shaft may extend into each of the differential unit and the power transfer unit. The first and second shafts may be rotationally engageable through the power transfer unit.

25 Claims, 2 Drawing Sheets

(56) References Cited

U.S. PATENT DOCUMENTS

| | | | | |
|---|---|---|---|---|
| 2014/0335995 A1* | 11/2014 | Swales | ................ | B60W 20/00 477/3 |
| 2015/0045170 A1* | 2/2015 | Ohmura | ................ | F16H 48/42 475/221 |
| 2015/0151634 A1* | 6/2015 | Smetana | ................ | B60K 1/02 475/150 |
| 2015/0152954 A1* | 6/2015 | Kajikawa | .............. | F16H 57/037 475/150 |
| 2015/0224867 A1* | 8/2015 | Nett | ........................ | B60K 1/00 180/65.25 |
| 2015/0226297 A1* | 8/2015 | Knoblauch | .......... | B60K 7/0007 475/150 |

\* cited by examiner

ELECTRIC DRIVE SYSTEM

TECHNICAL FIELD

The field to which the disclosure generally relates includes vehicle drive systems and more particularly, includes vehicle drive systems with electric motive input.

BACKGROUND

Vehicle drive systems may include a combustion engine, electric motor or another power plant for propulsion. Hybrid vehicles may include a combination of different types of power plants.

SUMMARY OF ILLUSTRATIVE VARIATIONS

According to a number of illustrative variations, a product may include a differential unit that may be engaged with first and second axle shafts that may be driven from a common gear. An electrical machine may be positioned on a first side of the differential unit. A first shaft may extend from the electrical machine and into the differential unit. A power transfer unit may be positioned on a second side of the differential unit opposite the first side. A second shaft may extend into each of the differential unit and the power transfer unit. The first and second shafts may be rotationally engageable through the power transfer unit.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
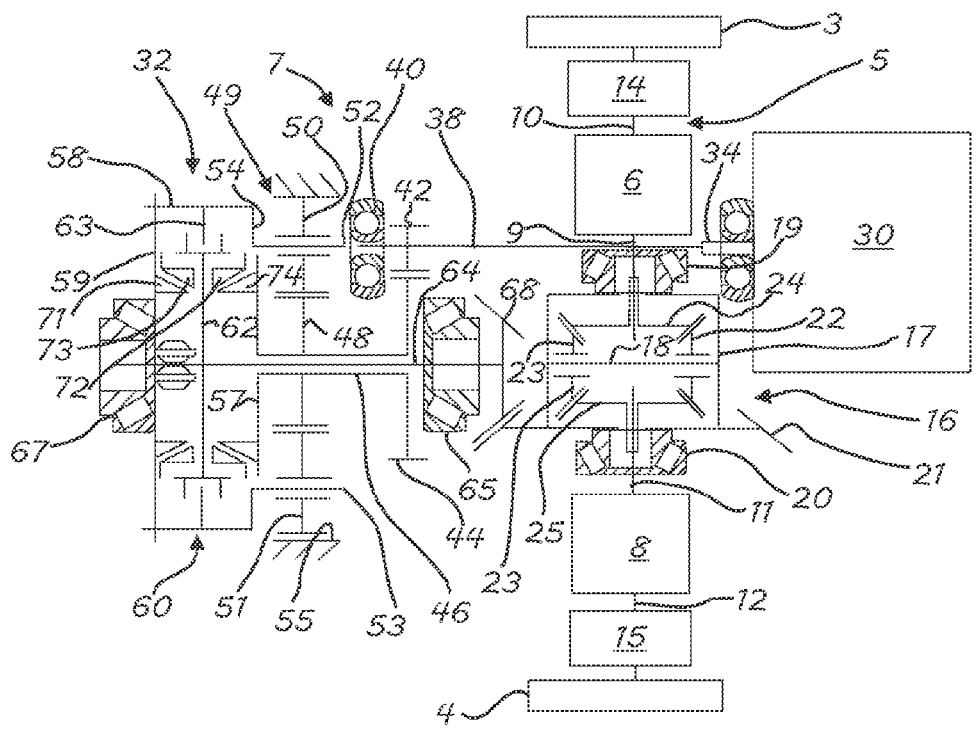
FIG. 1 is a schematic illustration of a product showing part of a vehicle powertrain according to a number of variations.

In a number of variations as illustrated in FIG. 1, a product 7 may include road wheels 3 and 4 which may be connected to an axle assembly 5. The axle assembly 5 may include inner joints 6 and 8, which may be constant velocity joints that may transfer rotation and may allow for angular variation between the connected components as known in the art. The joint 6 may connect an axle shaft 9 with an axle shaft 10. The Joint 8 may connect an axle shaft 11 with an axle shaft 12. The axle shafts 10 and 12 may be connected with outer joints 14 and 15 respectively, which may be constant velocity joints and may be connected to the road wheels 3 and 4, respectively, directly or through another axle shaft element.

In a number of variations the axle assembly 5 may have a differential unit 16. The differential unit 16 may include a cage 17 and may have a pinion shaft 18 that may be engaged at each of its ends with the cage 17. The cage 17 may be rotatable and may be carried by bearings 19 and 20. A gear 21 may be engaged with the cage 17 to rotate therewith. The gear 21 may be a ring gear and may be a bevel gear and may be a spiral bevel right angle gear. The pinion shaft 18 may carry a pinion gear 22 and a pinion gear 23, each of which may be rotatable on the pinion shaft 18. A side gear 24 may mesh with each of the pinion gears 22, 23 and another side gear 25 may mesh with each of the pinion gears 22, 23. Rotation of the cage 17 may cause the pinion gears 22, 23 to rotate, which may cause the side gears 24, 25 to rotate.

In a number of variations the axle shaft 9 may have an end that may be engaged with the side gear 24 to rotate therewith and may have its opposite end engaged with the inner joint 6. The axle shaft 11 may have an end that may be engaged with the side gear 25 to rotate therewith and may have its opposite end engaged with the inner joint 8. Rotation of the gear 21 may cause the cage 17 to rotate and through the pinion gears 22, 23 and the side gears 24, 25 may cause the axle shafts 9 and 11 to rotate driving the road wheels 3, 4.

In a number of variations an electrical machine 30 may be connected with the axle assembly 5 through a power transfer unit 32. The electrical machine 30 may be a motor or may be a motor-generator, or may be another type of electrical machine to provide power to the power transfer unit 32. A shaft 34, which may be a rotor shaft, and which may be a part of the rotor, may extend from the electrical machine 30 and may be supported by bearings 36. The shaft 34 may be engaged with the proximal end of a shaft 38, or may itself, extend past the axle assembly 5 (without connecting directly thereto), and may have a distal end supported for rotation by bearings 40. A gear 42, which may be a helical gear may be fixed on the shaft 34 or 38 to rotate therewith and may be disposed in the power transfer unit 32.

In a number of variations the gear 42 may mesh with, and may be positively engaged to rotate with, a gear 44, which may also be included in the power transfer unit 32. The gear 44 may be a helical gear and may have a larger diameter than the gear 42 to provide a reduction there between from the shaft 34 or 38. The gear 44 may be connected with a torque transfer element 46 that may be tubular in shape and may be connected or engaged with, and may be positively engaged to rotate with, a gear 48. The gear 48 may be a sun gear in a gear set 49, which may be a planetary gear set. The gear 48 may mesh with, and may be positively engaged to rotate with gears 50 and 51. The gears 50, 51 may be planet gears and another number may be provided. The gears 50, 51 may rotate on pins 52 and 53, respectively, which may be fixed to a carrier 54. The gears 50, 51 may mesh with and may be positively engaged to rotate with a gear 55 which may be a ring or annulus gear and may include internal teeth. The gear 55 may be held or grounded so that it may be fixed from rotation. Rotation of the gear 48 may cause the gears 50, 51 to rotate and to walk around the inside of the gear 55 which may cause the carrier 54 to rotate. The torque transfer element 46 may be connected to or formed with, or the gear 48 may be connected to or formed with, a torque transfer element 57. The torque transfer element 46, the gear 48 and the torque transfer element 57 may rotate with the gear 44. The carrier 54 may be connected to or formed with a torque transfer element 58 and may rotate therewith. An additional torque transfer element 59 may be connected with the torque transfer element 58 and may be supported by bearings for rotation around a shaft 64.

In a number of variations an engagement coupling 60 may include an engagement element 62 that may be fixed to rotate with the shaft 64 and may be axially slidable on the shaft 64. The shaft 64 may be supported for rotation by bearings 65, 67 and may extend through the torque transfer element 46. A gear 68 may be fixed with the shaft 64 to rotate therewith and may mesh with and may be positively engaged to rotate with the gear 21 to drive, or be driven by, the axle assembly 5. The gear 68 may be a bevel gear and may be a spiral bevel right angle gear. The gear 68 may be a common gear driving both axle shafts 9 and 11. The engagement element 62 may selectively disconnect the driven gear set 49 from the shaft 64 as shown in FIG. 1 and may be placed in a centered neutral position. The engagement element 62 may be selectively shifted to the right as viewed in FIG. 1 by a shift fork 63 to selectively connect the gear set 49 with the shaft 64 with output from the gear 48 and its connected torque transfer element 57 to provide a high range of operation. The engagement element 62 may be selectively shifted to the left as viewed in FIG. 1 by the shift fork 63 to connect the gear set 49 with the shaft 64 with output from the carrier 54 and its connected torque transfer elements 58, 59 to provide a low range of operation. When input may be provided from the gear 48 to the shaft 64, rotational speed from the torque transfer element 46 may be maintained. When input may be provided from the carrier 54 to the shaft 64, rotational speed from the torque transfer element 46 may be reduced and torque may be increased.

Figure 2:
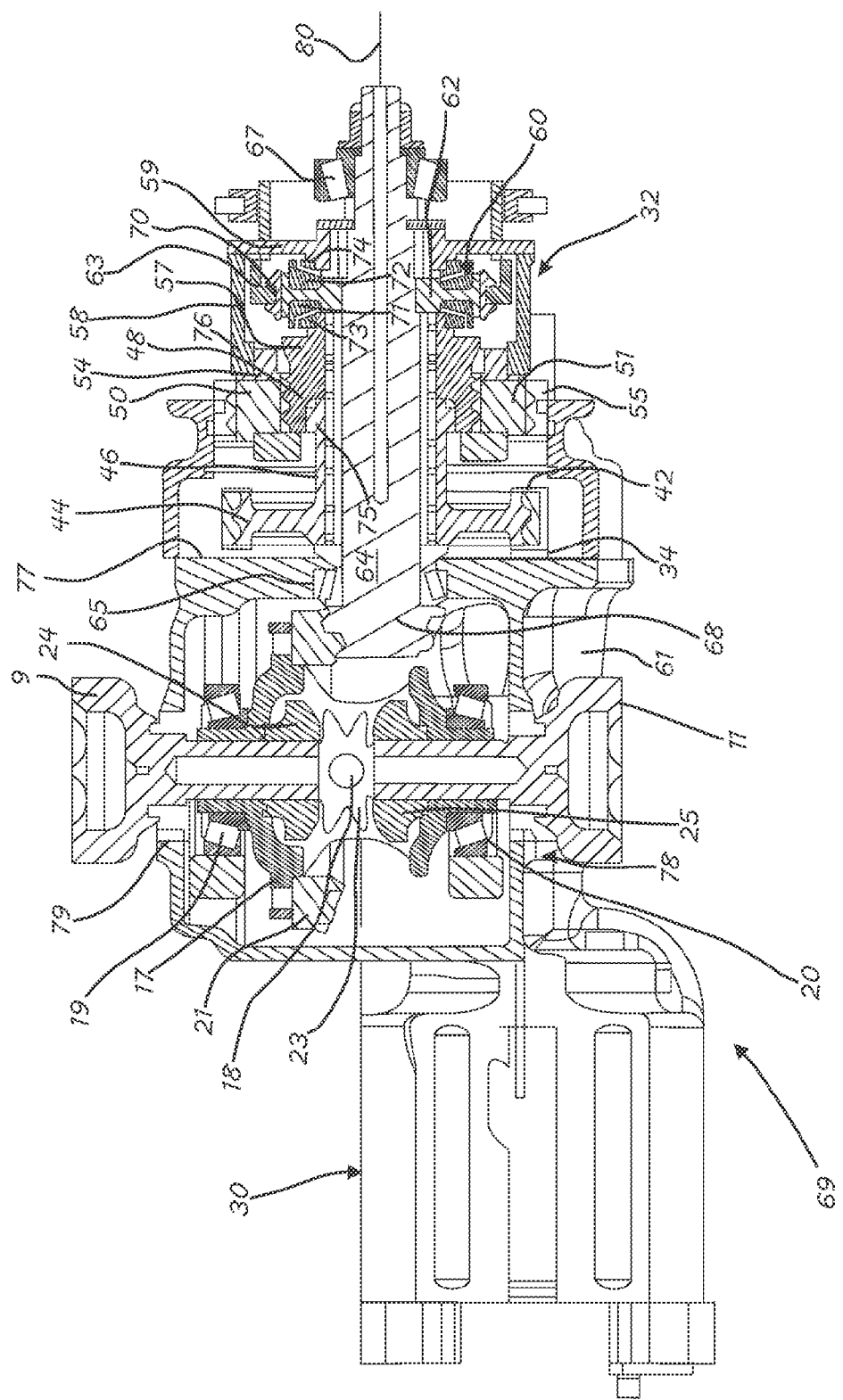
FIG. 2 is a fragmentary cross sectional illustration of a product showing part of a vehicle powertrain according to a number of variations.

With reference to FIG. 2, elements that are like elements in FIG. 1 are indicated with the same reference numerals. In a number of variations a product 69 may include the electrical machine 30 that may provide rotational torque to the axle shafts 9 and 11, or that may receive rotational torque input from the axle shafts 9 and 11, such as for regenerative braking. The electrical machine 30 may include a shaft 34 that may extend through the housing 61 to the gear 42 which may be engaged with the gear 44. The gear 44 may be connected with the torque transfer element 46, which may include an end 75 that may be positioned within the gear 48 and that may be rotationally fixed therewith such as through a splined connection. The gear 48 may be connected with the torque transfer element 57 that may extend to a location adjacent the engagement coupling 60. On a side of the engagement coupling 60 opposite the torque transfer element 57, the torque transfer element 59 may be connected with, and may be rotationally fixed with, the carrier 54, which may occur through the intermediate torque transfer element 58. The torque transfer element 58 may be connected to the torque transfer element 59 and may include an end 76 that may extend over, and may be engaged with, the carrier 54. The carrier 54 may carry the gears 50 and 51. The gears 50 and 51 may be rotationally engaged between the gear 55 and the gear 48. The engagement element 62 may be connected, such as through an axially moveable splined connection, to the shaft 64 so that the engagement element 62 and the shaft 64 may rotate together. The shaft 64 may be connected with the gear 68, which may be engaged with the gear 21 to rotate therewith. The gear 21 may be fixed to the cage 17, the rotation of which may transfer rotation to the pinion gears 22 and 23. Pinion gear 23 is visible in the sectioned view of FIG. 2 which may rotate on the pinion shaft 18. Rotation of the pinion gears 22, 23 may transfer rotational torque to the side gears 24, 25 which may be fixed to the axle shafts 9, 11, respectively.

In a number of variations the gear 21, the cage 17, the pinion gears 22, 23 and the side gears 24, 26 may be assembled in a differential unit 78. The gears 42, 44, the gear set 49 and the engagement coupling 60 may be assembled in the power transfer unit 32, which may be positioned on one side 77 of the differential unit 78. The reduction gear arrangement of the gear set 42, 44 within the power transfer unit 32 may be easily lubricated by oil in the power transfer unit 32 with the meshing interface provided at one location. The electrical machine 30 may be positioned on a side 79 of the differential unit 78 opposite the side 77. The motor shaft 34 and the shaft 64 may be parallel with each other and each may extend into the differential unit 78. The gear 21 may generate splash oil for lubricating and cooling the electrical machine 30 with oil from inside the differential unit 78. The gear 44 and the gear 68 may rotate about a common axis 80, which may simplify assembly. Separation of the electrical machine 30 and the power transfer unit 32 on opposite sides of the differential unit 78 may provide advantageous packaging options.

In a number of variations the engagement coupling 60 may include the engagement element 62, which may be the hub of a dual cone type synchronizing clutch or synchronizer. An annular groove 70 may be provided around the outer circumference of the engagement element 62 within which the shift fork 63 may be received. Range selection may be performed by an actuator (not shown) that may move the shift fork 63 to move the engagement element 62 axially on the shaft 64. The engagement coupling may include reaction rings 71 and 72 that may be fixed to the respective torque transfer element 57 and torque transfer element 59. A blocker ring 73 may be positioned between the reaction ring 71 and the engagement element 62, and a blocker ring 74 may be positioned between the reaction ring 72 and the engagement element 62. Friction material may be carried between corresponding mating surfaces of the blocker rings and reaction rings. The shift fork 63 may be shifted to the left as viewed in FIG. 3 to transfer torque between the engagement element 62 and the torque transfer element 59 through the blocker ring 71 and reaction ring 73. The shift fork may center the engagement element 62 for neutral as shown in FIG. 1. The shift fork 63 may be shifted to the right as viewed in FIG. 4 to transfer torque between the engagement element 62 to the torque transfer element 57 through the blocker ring 72 and reaction ring 74.

Figure 3:
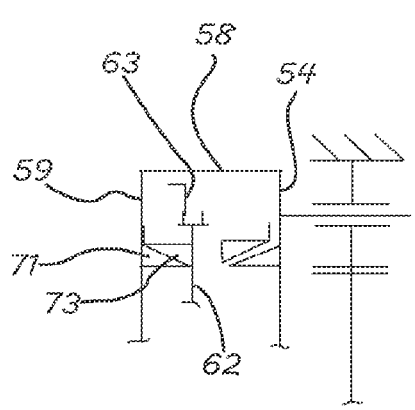
FIG. 3 is a schematic illustration of part of a product showing part of an engagement coupling according to a number of variations.
Figure 4:
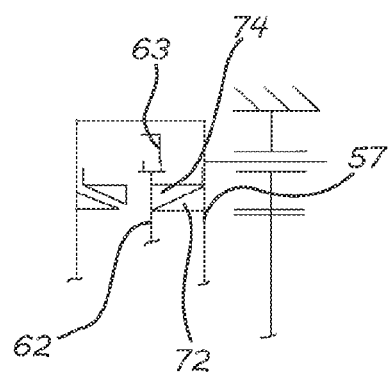
FIG. 4 is a schematic illustration of part a product showing part of an engagement coupling according to a number of variations.

With reference to FIGS. 1-3, rotational engagement of the blocker ring 71 with the reaction ring 73 by moving the shift fork 63 shifting the engagement element 62 toward the reaction ring 73, may transfer torque between the carrier 54 (through the torque transfer elements 58, 59), and the engagement element 62. This may provide a mode where the shaft 64 may be driven by the carrier 54. Providing output from the gear set 49 at the carrier 54, with the gear 55 fixed, may provide a low range mode at a first gear ratio. Rotational engagement of the blocker ring 72 with the reaction ring 74 by moving the shift fork 63 shifting the engagement element 62 toward the reaction ring 74, may transfer torque between the gear 48 (through the torque transfer element 57), and the engagement element 62. This may provide a mode where the shaft 64 may be driven by the gear 48 which may be a sun gear. Providing output from the gear set 49 at the gear 48 may provide a high range mode at a second gear ratio, transferring a higher speed transfer than the low range mode. As shown in FIG. 1, the shift fork 63 may center the engagement element 62 between the reaction rings 73, 74 so that no torque may be transferred through the engagement coupling 60.

The axle assembly 5 may be the rear axle of a vehicle with an internal combustion engine driven front axle or transaxle, and may provide a hybrid powertrain. For efficient power absorption or deployment, the electrical machine 30 may be driven from the axle assembly 5, or may drive the axle assembly 5, without going through the engine. To recover braking energy from the road wheels 3, 4 the engagement coupling 60 may be engaged so that the electrical machine 30 may be driven from the axle assembly 5. In a number of variations the axle 5 may be operated in electric all wheel drive mode by driving the axle assembly 5 from the electrical machine 30. Energy recovery may be maximized by use of the electrical machine 30 at the rear axle while simultaneously providing improved stability control by controlling torque at each axle assembly of an associated vehicle. A method of controlling vehicle dynamics may be provided by apportioning regen torque to the axle assembly 5 through the electrical machine 30. A method of controlling vehicle dynamics may be provided by apportioning propulsion torque to the axle assembly 5 through the electrical machine 30. Through the use of the electrical machine 30 at the rear axle 5, electric drive assistance may increase grade climb and may provide electrical assist launch or creep operation for low speed maneuvering.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a differential unit that may be engaged with first and second axle shafts that may be driven from a common gear. An electrical machine may be positioned on a first side of the differential unit. A first shaft may extend from the electrical machine and into the differential unit. A power transfer unit may be positioned on a second side of the differential unit opposite the first side. A second shaft may extend into each of the differential unit and the power transfer unit. The first and second shafts may be rotationally engageable through the power transfer unit.

Variation 2 may include the product according to variation 1 wherein the power transfer unit may comprise a first gear set that may include a first gear disposed around the second shaft and that may be rotatable relative to the second shaft. A second gear may be rotationally engaged with the first gear and may be fixed to the first shaft.

Variation 3 may include the product according to variation 2 wherein an axis may extend through the second shaft about which the second shaft may rotate. The common gear and the first gear may both rotate about the axis.

Variation 4 may include the product according to variation 2 or 3 wherein the first and second gears may be helical gears. The first gear may be larger than the second gear and may provide a reduced rotational speed from the first shaft to the second shaft.

Variation 5 may include the product according to any of variations 2 through 4 and may include a second gear set that may have a third gear rotationally fixed to the first gear. A fourth gear may be fixed against rotation. At least one fifth gear may be rotationally engaged between the third and fourth gears.

Variation 6 may include the product according to variation 5 wherein the second shaft may be driven by the third gear.

Variation 7 may include the product according to variation 6 wherein the third gear may be selectively engageable with the second shaft through an engagement coupling.

Variation 8 may include the product according to any of variations 5 through 7 wherein the at least one fifth gear may be carried by a carrier.

Variation 9 may include the product according to variation 8 wherein the second shaft may be driven by the carrier.

Variation 10 may include the product according to variation 9 wherein the carrier may be selectively engageable with the second shaft through an engagement coupling.

Variation 11 may involve a product comprising a differential unit that may be engaged with at least one axle shaft. A road wheel may be connected to the at least one axle shaft. A first gear may be drivingly engaged with the at least one axle shaft. A second shaft may define an axis around which the second shaft may be rotatable. The second shaft may be connected with the first gear. A second gear may be provided through which the second shaft may extend. The second gear may be rotatable relative to the second shaft. An electrical machine may be drivingly engaged with the second gear. The first and second gears may both rotate about the axis.

Variation 12 may include the product according to variation 11 and may include a third gear that may extend around the second shaft. The third gear may be rotatable relative to the second shaft. A fourth gear may be fixed from rotation and may extend around the third gear. At least one fifth gear may be rotationally engaged between the third and fourth gears.

Variation 13 may include the product according to variation 12 wherein the second shaft may be selectively driven by the third gear. The third gear may be selectively engageable with the second shaft through an engagement coupling.

Variation 14 may include the product according to variation 12 or 13 wherein the at least one fifth gear may be carried by a carrier. The second shaft may be selectively driven by the carrier. The carrier may be selectively engageable with the second shaft through the engagement coupling.

Variation 15 may include the product according to variation 11 and may include a hybrid all wheel drive mode wherein the axle shaft may be part of a rear axle and the electrical machine may drive the rear axle.

Variation 16 may include the product according to variation 11 wherein the electrical machine may operate as a motor providing traction torque to the axle shaft and may operate as a generator providing braking torque to the axle shaft.

Variation 17 may include the product according to variation 16 wherein the traction or braking torque may be apportioned to the axle shaft.

Variation 18 may include the product according to variation 17 wherein the engagement coupling may be selectively engaged to apportion traction or braking torque.

Variation 19 may include the product according to variation 16 and may include a hybrid all wheel drive mode wherein the axle shaft may be part of a rear axle and the electrical machine may drive the rear axle.

Variation 20 may involve a product and may include a differential that may be engaged with first and second axle shafts both driven by a first gear. A first shaft may be rotationally fixed to the first gear. An electrical machine may have a rotor. A second gear may be rotationally fixed to the rotor. A third gear may be in meshing engagement with the second gear. The third gear may be rotationally fixed to a fourth gear. The fourth gear may be selectively engaged with the shaft through an engagement coupling. A fifth gear may be in meshing engagement with the fourth gear and may be carried on a carrier. The carrier may be rotatable and may be selectively engaged with the shaft through the engagement coupling.

What is claimed is:

1. A product comprising a differential unit engaged with first and second axle shafts driven from a common gear, an electrical machine positioned on a first side of the differential unit and a first shaft extending from the electrical machine and into the differential unit, and a power transfer unit positioned on a second side of the differential unit opposite the first side, with a second shaft extending into each of the differential unit and the power transfer unit, wherein the first and second shafts are rotationally engageable through the power transfer unit, wherein the power transfer unit comprises a first gear set with a first gear disposed around the second shaft and rotatable relative to the second shaft, and a second gear rotationally engaged with the first gear and fixed to the first shaft, and a second gear set with a third gear rotationally fixed to the first gear, a fourth gear fixed against rotation, and at least one fifth gear rotationally engaged between the third and fourth gears.

2. The product according to claim 1 wherein the common gear is a bevel gear.

3. The product according to claim 1 further comprising an axis extending through the second shaft about which the second shaft rotates, wherein the common gear and the first gear both rotate about the axis.

4. The product according to claim 1 wherein the first and second gears are helical gears, the first gear larger than the second gear providing a reduced rotational speed from the first shaft to the second shaft.

5. The product according to claim 1 wherein the second gear set is a planetary gear set.

6. The product according to claim 1 wherein the second shaft is drivable by the third gear.

7. The product according to claim 6 wherein the third gear is selectively engageable with the second shaft through an engagement coupling.

8. The product according to claim 1 wherein the at least one fifth gear is carried by a carrier.

9. The product according to claim 8 wherein the second shaft is drivable by the carrier.

10. The product according to claim 9 wherein the carrier is selectively engageable with the second shaft through an engagement coupling.

11. A product comprising a differential unit engaged with at least one axle shaft, a road wheel connected to the at least one axle shaft, a first gear drivingly engaged with the at least one axle shaft, a second shaft defining an axis around which the second shaft is rotatable, the second shaft fixedly connected with the first gear, a second gear through which the second shaft extends, the second gear rotatable relative to the second shaft, and an electrical machine drivingly engaged with the second gear, wherein the first and second gears both rotate about the axis, and a third gear extending around the second shaft, the third gear rotatable relative to the second shaft, a fourth gear fixed from rotation and extending around the third gear, and at least one fifth gear rotationally engaged between the third and fourth gears.

12. The product according to claim 11 further comprising an engagement coupling wherein the third gear is selectively engageable with the second shaft through the engagement coupling.

13. The product according to claim 11 wherein the second shaft is selectively driven by the third gear, wherein the third gear is selectively engageable with the second shaft through an engagement coupling.

14. The product according to claim 13 wherein the at least one fifth gear is carried by a carrier, wherein the second shaft is selectively driven by the carrier, and wherein the carrier is selectively engageable with the second shaft through the engagement coupling.

15. The product according to claim 11 further comprising a hybrid all wheel drive mode wherein the axle shaft is a part of a rear axle and the electrical machine drives the rear axle.

16. The product according to claim 11 wherein the electrical machine operates as a motor providing traction torque to the axle shaft and operates as a generator providing braking torque to the axle shaft.

17. The product according to claim 16 wherein the traction or braking torque is apportioned to the axle shaft.

18. The product according to claim 17 wherein the engagement coupling is selectively engaged to apportion the traction or braking torque.

19. The product according to claim 16 further comprising a hybrid all wheel drive mode wherein the axle shaft is a part of a rear axle and the electrical machine drives the rear axle.

20. A product comprising a differential engaged with first and second axle shafts both driven by a first gear, a first shaft rotationally fixed to the first gear, an electrical machine having a rotor, a second gear rotationally fixed to the rotor, a third gear in direct contact meshing engagement with the second gear and a fourth gear rotationally fixed to the third gear, the fourth gear selectively engaged with the shaft through an engagement coupling, a fifth gear in direct contact meshing engagement with the fourth gear and carried on a carrier, the carrier rotatable and selectively engaged with the shaft through the engagement coupling.

21. The product according to claim 20 further comprising a torque transfer element that is fixed to the third and fourth gears wherein the torque transfer element is tube shaped.

22. The product according to claim 20 further comprising a second shaft connected with the rotor and extending from a first side of the first and second axle shafts to a second side of the first and second axle shafts, the second gear fixed to the rotor by the second shaft.

23. A product comprising an axle assembly, an electrical machine selectively driving the axle assembly, a shaft extending from the electrical machine, a first gear fixed to the shaft, a second gear in direct contact meshing engagement with the first gear, a planetary gear set, an engagement coupling, and a torque transfer element fixed to each of the second gear, the planetary gear set and the engagement coupling, wherein the electrical machine drives the axle assembly through the engagement coupling and at least one of: a) the first and second gears, or b) the planetary gear set.

24. The product according to claim 23 wherein the first and second gears are helical gears, the first gear larger than the second gear providing a reduced rotational speed from the shaft to the axle assembly.

25. The product according to claim 23 wherein the electrical machine drives the axle assembly through the first and second gears and the engagement coupling to provide a first mode of operation and the electrical machine drives the axle assembly through the first and second gears, the planetary gear set, and the engagement coupling to provide a second mode of operation.

* * * * *